United States Patent [19]

Himmler

[11] Patent Number: 4,955,229
[45] Date of Patent: Sep. 11, 1990

[54] METHOD AND APPARATUS FOR DETERMINING THE UNIFORMITY OF PNEUMATIC TIRES

[75] Inventor: Günther Himmler, Darmstadt, Fed. Rep. of Germany

[73] Assignee: Gebr. Hofmann GmbH & Co. KG Maschinenfabrik, Pfungstadt, Fed. Rep. of Germany

[21] Appl. No.: 424,107

[22] Filed: Oct. 20, 1989

[30] Foreign Application Priority Data

Oct. 21, 1988 [DE] Fed. Rep. of Germany ....... 3835985

[51] Int. Cl.$^5$ .......................................... G01M 17/02
[52] U.S. Cl. ................................................ 73/146
[58] Field of Search ..................................... 73/146

[56] References Cited

U.S. PATENT DOCUMENTS 3,895,518 7/1975 Leblond ............................. 73/146
4,055,081 10/1977 Honlinger ......................... 73/146

Primary Examiner—Donald O. Woodiel
Attorney, Agent, or Firm—Cushman, Darby & Cushman

[57] ABSTRACT

A method and apparatus is proposed for determining the uniformity of pneumatic tires. The apparatus has two measuring rim halves between which a tire to be tested can be mounted and rolled along a test drum. The apparatus has a measuring system for measuring force fluctuations resulting from nonuniformities of the tire and for emitting a corresponding signal, and an evaluation system which evaluates tire uniformity by subtracting a correction signal obtained from eccentricities of the measuring rim halves from a measurement signal. In this way, a compensation of the error component in the measurement signal resulting from eccentricity of the rim halves is obtained.

19 Claims, 2 Drawing Sheets

FIG.2
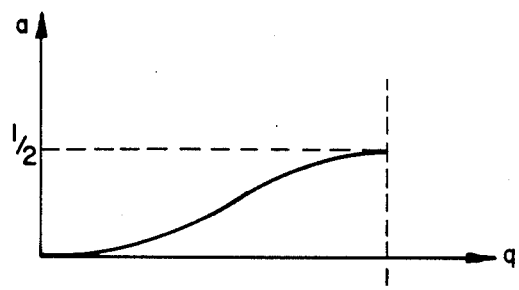
FIG.3A
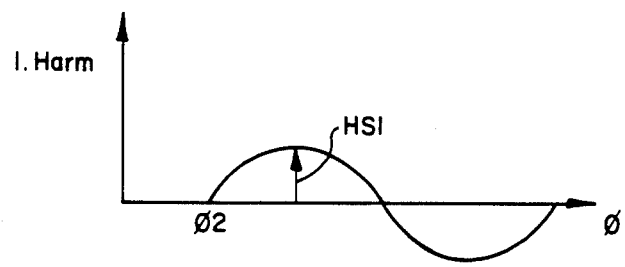
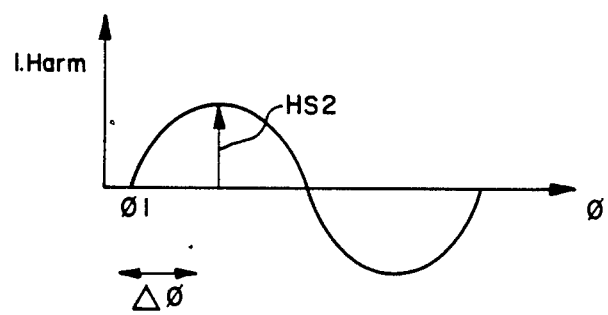
FIG.3B

METHOD AND APPARATUS FOR DETERMINING THE UNIFORMITY OF PNEUMATIC TIRES

FIELD OF THE INVENTION

The invention relates to a method and apparatus for determining the uniformity of pneumatic tires.

BACKGROUND OF THE INVENTION

Such apparatus is used in industry in the form of tire uniformity measuring machines. Quality control of finished motor vehicle tires requires such equipment. By measuring the radial and lateral force fluctuations of the tire rolling under load, the uniformity of the tire can quickly be determined. One such tire uniformity measuring machine is described in the Hofmann Report 89 (September 1984). For performing the measurement run, the tire to be tested is mounted in a tire holding system comprising two measuring rim halves and is rolled along a test drum serving as the tire contact surface. With suitably embodied measuring equipment in the vicinity of the drum axis, force fluctuations resulting from nonuniformities of the tire can then be measured.

Eccentricities of the measuring rim system have been ignored in the measuring systems known until now. Such eccentricities generate radial force fluctuations which are transmitted through the tire to the test drum. Known measuring systems measure the total force fluctuations. These total fluctuations include both force fluctuations originating in the tire, and additionally, force fluctuations resulting from the eccentricities of the measuring rim system. Since the known measuring systems can not distinguish between tire fluctuations and measuring rim fluctuations, cases occur in which a tested tire, because of its uniformity, generates radial force fluctuations that are within an acceptable tolerance, yet, because of the component added by the eccentricities of the measuring rims, produces a measurement value that is outside the limit of tolerance. Thus, a uniform tire is rejected as being nonuniform because of error introduced by the measuring rims.

OBJECT AND SUMMARY OF THE INVENTION

It is accordingly an object of the present invention to devise a method and apparatus in which an error component in the measurement force fluctuation signal resulting from errors in the geometry of the measuring rim system is compensated for.

In the present invention, eccentricities resulting from errors in geometry of the measuring rim system are taken into account along with tire rigidity to determine a resultant force fluctuation. The force fluctuation thus obtained is subtracted in phase from the total measured force fluctuation, so that the remaining error for the indicated force fluctuation of the tire is minimized.

The present invention solves the basic problem of known measuring instruments propagating the measuring rim eccentricity through the bead and side wall of the tire to the tire contact surface and ultimately, to the test drum.

Although the tire bead has an elastic ring structure, the bending rigidity of the tire has an integrating effect on information induced over the circumference of the inside diameter of the bead such as the eccentricity of the measuring rim system. As a result, an evaluation of the first harmonic of the eccentricity can be considered sufficient in a first approximation, since higher harmonics have lesser significance for this evaluation. This observation applies equally to both halves of the measuring rim. The amount of the first harmonic is a mean mass for the travel impingement of the respective measuring rim half, which is released via the tire bead into the tire side wall and onto the tire contact surface. This impingement is then expressed in the force fluctuation measurement as an error component. In processing the error signals obtained in the scanning of the measuring rim, the first harmonics of these signals are therefore preferentially used.

The measured force fluctuations are composed of a vectorial addition of the force fluctuations originating in the tire and the force fluctuations originating in the eccentricity of the measuring rim system. It is possible to obtain an accurate measurement signal that contains only the force fluctuation originating in the tire by mere vectorial subtraction only if the eccentricities of the two rim halves do not exceed a certain phase difference. With a compact measuring rim, this phase difference should not exceed 60°. In a measuring rim that comprises two separate rim halves, the phase difference of the eccentricities of the two rim halves can be eliminated. In a further feature of the invention, the two rim halves can be positioned in such a way with respect to one another that their respective first harmonics resulting from their eccentricities are in phase with each other.

The scanners for scanning the measuring rim can operate mechanically, and can, in one embodiment, be scanning rollers. In a preferred embodiment, the scanners are optical scanners, in particular laser beam scanners, which scan the rim in the vicinity a rim surface contacting the tire.

For in-phase positioning of the two rim halves to one another, a marking that is scanned by a sensor is provided on each of the two rim halves. The course of the eccentricity can then be referenced for each rim in terms of phase to the fixed mark on the rim. Based on the information on the relative phase location of the two eccentricity courses thus obtained, the phase difference between these two courses can be determined. As a function thereof, the two rim halves can be rotated relative to one another such that the phases of the first harmonics which result from the eccentricities, match one another. The positioning can be effected in such a way that with rim halves disposed one above the other, for instance, and rotating about a common vertical axis, the upper rim half can be correspondingly rotated relative to the lower rim half.

In the measurement runs for successive tires, the same phase reference is then preferably established for detecting rim half eccentricities and tire nonuniformities. For obtaining the phase reference, a scanned marking revolving with the two measuring rim halves can be used. For instance, the marking provided on one of the two measuring rim halves, preferably on the lower measuring rim half, is used.

With the foregoing in mind, other objects, features and advantages of the present invention will become more apparent upon consideration of the following description and the appended claims with reference to the accompanying drawings, all of which form part of this specification, wherein like reference numerals designate corresponding parts and various figures.

BRIEF DESCRIPTION OF THE DRAWINGS

FIG. 2 is a graph plotting the curve of a function variable that is used in obtaining the correction signal; and FIG. 3a is a graph of the curve of the first harmonic resulting from the eccentricity of a first rim half;

FIG. 3b is a graph of the curve of the first harmonic resulting from the eccentricity of a second rim half.

DESCRIPTION OF THE PREFERRED EXEMPLARY EMBODIMENT

Figure 1:
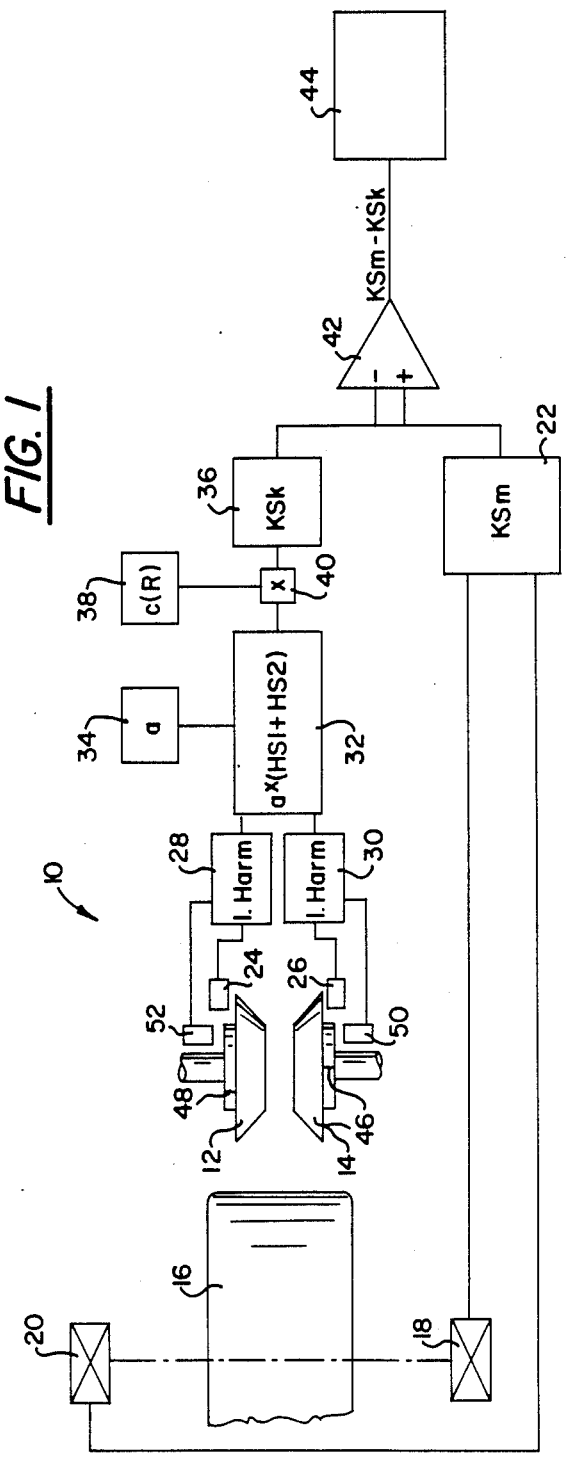
FIG. 1 is a block circuit diagram for an exemplary embodiment of a measuring system in which compensation for the error signal resulting from concentricity errors of the measuring rim system is attained, and which is used in an apparatus for determining the uniformity of pneumatic tires.

The arrangement shown schematically in FIG. 1 is a tire uniformity measuring machine 10. A tire to be tested (not shown), which is mounted between an upper measuring rim half 12 and a lower measuring rim half 14, is rolled at a predetermined test pressure against a test drum 16. During the measurement run, force measuring instruments 18 and 20 measure force fluctuations, and in particular, radial and lateral force fluctuations. Corresponding measurement signals from the measuring instruments are sent to a measurement signal amplifier 22 which forms an output signal KSm. In an alternative embodiment, a one-piece, compact measuring rim can be used instead of the two-piece measuring rim shown in FIG. 1.

In the embodiment shown in FIG. 1, measuring scanners 24 and 26 are also provided, which measure fluctuations in geometry of the measuring rim halves 12 and 14. The measuring scanners 24 and 26 can measure fluctuations in the radial and lateral directions of the rim halves 12 and 14. The output signals of the scanners 24 and 26 resulting from the eccentricities of the rim halves 12 and 14 are sent to harmonic circuits 28 and 30 to form harmonics of the signals. In the embodiment shown, first harmonics are formed. The output signals of the harmonic circuits 28 and 30 are then sent to an adding device 32, which sums the amplitudes (HS1 and HS2) of the two first harmonics. The adding device 32 then multiplies this sum by a weighting factor $\alpha$ furnished by a memory 34, so that a representative value for the individual fluctuations in height of the two rim halves 12 and 14 is obtained. A sine wave generator 36 forms a sinusoidal analog signal from an output signal of the adding device 32, taking into account a factor c(R) representing an equivalent tire rigidity furnished by a memory device 38 in the sinusoidal analog signal. Since tire rigidity has an effect on how the eccentricities of the rim halves 12 and 14 are measured by instruments 18 and 20, it must be compensated for. The fluctuations in height of the two rim halves are represented in the sinusoidal analog signal by the amplitudes of the two first harmonics, with the sinusoidal signal having the same period as the rotation of the rim halves 12 and 14. A correction signal KSk is then formed by the sine wave generator 36. The factor c(R), representing the tire rigidity, can be multiplied by the output signal of the adding device 32 in a multiplier 40. The sinusoidal signal of the sine wave generator 36 can also be multiplied by the factor c(R).

Both the output signal KSm and the correction signal KSk are delivered to a subtractor 42, in which the correction signal KSk is subtracted from the measurement signal KSm, and the difference is delivered to an evaluation circuit 44 well known in the art. The differential signal is further processed in the evaluation circuit 44 and the uniformity of the tire is indicated.

The scanners 24 and 26 are embodied as optical scanners. In a preferred embodiment, the scanners 24 and 26 are laser scanners. The scanners 24 and 26 scan the rim halves 12 and 14 in the vicinity of a rim surface contacting the tire.

The mode of operation of the measuring machines shown in FIG. 1 will now be described in further detail, with reference to FIGS. 2 and 3. From the two measurement signals of the scanners 24 and 26, which indicate geometric errors of the rim halves 12 and 14, the respective first harmonics are formed in the harmonic circuits 28 and 30. The curves of these first harmonics are shown in FIGS. 3a and 3b. From the first harmonics, the two amplitudes HS1 and HS2, which represent the individual fluctuations in height of the two rim halves 12 and 14, are formed. This can be done in the harmonic circuits 28 and 30, and corresponding output signals are furnished by the harmonic circuits 28 and 30. As seen in FIGS. 3a and 3b, the amplitude HS2 is greater than the amplitude HS1. In most cases, the first harmonics of the fluctuation signals resulting from the eccentricities of the two rim halves 12 and 14 have different amplitudes. The different amplitudes of the two first harmonics represent the individual height fluctuations of the two rim halves 12 and 14. It is necessary to form a resultant value from these two amplitudes which best represents the total effect of the individual fluctuations. The sum of the amplitudes of the two first harmonics (HS1+HS2) proves to be a representative value and is formed in the adding device 32. The sum (HS1+HS2) is then multiplied by a weighting factor $\alpha$. The factor $\alpha$, as seen in FIG. 2, is a function of q. In turn, q is the ratio of the smaller amplitude of the two first harmonics to the larger amplitude of the two first harmonics.

For multiplication by the weighting factor $\alpha$, the adding device 32 is also connected with a memory device 34, in which a corresponding value is memorized. As already explained above, $\alpha = f(q)$, where $q = HS1/HS2$. If HS1 is greater than HS2, the ratio q is inverted, that is, $q = HS2/HS1$. In the case where HS1=HS2, then q=1. Thus, q is always less than or equal to 1. In the case of q=1, $\alpha = \frac{1}{2}$. The functional relationship between $\alpha$ and q can be represented by an empirical characteristic curve (FIG. 2) or in closed fashion by a function.

The adding device 32 furnishes an output signal $\alpha \times (HS1+HS2)$. In the embodiment shown, it is assumed that the two first harmonics of the fluctuation signals that result from the eccentricities of the rim halves 12 and 14 have the same phase with respect to one another.

In the curve graphs of FIGS. 3a and 3b, the first harmonics of the fluctuation signals are shown in the original state. In most cases, these first harmonics have a phase difference of $\blacktriangle \phi = (\phi 2 - \phi 1)$, because the concentricity errors or individual fluctuations in height of the rim halves 12 and 14 rarely have precisely the same phase. In order to be able to obtain a single signal representing the two individual height fluctuations of the rim halves 12 and 14, as is emitted by the adding device 32, it is advantageous to rotate the rim halves relative to one another such that the first harmonics of each rim half are in phase with each another. To this end, each of the rim halves 12 and 14 can have a marking 46 and 48, and these markings are scanned by scanners 50 and 52. In this way, a phase reference is obtained for the eccentricity course of each rim half 12 and 14. As a function of the established phase difference ▲ φ, the rim halves are then rotated relative to one another in such a way that the first harmonics formed in the harmonic circuits 28 and 30 are in phase.

This can be effected such that one rim half, preferably the upper half 12, which is also displacable vertically for adaptation to various clearance widths, is rotated relative to the other rim half, preferably the lower half 14, by the corresponding angle ▲ φ. Once this correction process is completed, the actual measurements for determining the uniformity of the tire, which is now mounted between the rim halves 20 and 1, can begin.

In the measurement runs, the tire is pressed at a specific contact pressure against the test drum 16, and the force fluctuations are measured with the aid of the force measuring instruments 18 and 20, which in the embodiment shown in FIG. 1, are disposed in an axis of the test drum 16. The force fluctuation signals of the force measuring instruments 18 and 20 are delivered to the measurement signal amplifier 22. In the embodiment shown, these are the radial force fluctuations that result from the rolling of the tire. Since the force fluctuation signals delivered to the measurement signal amplifier 22 also contain components that originate in the eccentricities of the rim halves 12 and 14, these components must be removed from the amplifier output signal KSm. To this end, the correction signal KSk is formed in the sine wave generator 36, by the evaluation of the signal $\alpha \times (HS1 + HS2)$. In order for both the sinusoidal correction signal KSk and the measurement signal KSm to be in phase, a common phase reference is used. In a preferred embodiment, the marking 46 located on the lower rim half 14 and scanned by the scanner 50 is used. This assures that both the measurement signal KSm and the correction signal KSk are in phase. For forming the correction signal, as already explained, the equivalent tire rigidity c(R) is also taken into account.

The subtractor 42 then carries out the subtraction of the correction signal KSk from the measurement signal KSm, and the obtained differential signal (KSm−KSk) is processed further in the evaluation system 44 in order to determine the uniformity of the tire.

In the embodiment shown in FIG. 1, analog signal technology is used. However, in an alternative embodiment, digital signal technology can be used. To that end, the correction signal obtained from the sine wave generator 36 and the measurement signal obtained from the measurement signal amplifier 22 are digitized. The difference between the sampled values, i.e., the measurement signal and the correction signal, is then formed. The result is a corrected measurement signal course that is finally suitably processed in the evaluation system 44. To this end, a maximum value ascertainment and frequency analysis can be delivered to a suitable routine.

In an alternative embodiment, the measuring rim can be compact and in one piece instead of the two-piece rim shown in FIG. 1. In any case, however, rims should be used in which the phase difference between the height fluctuations of one rim half relative to the other is no greater than 60°. In that case, the adding device 32 is embodied as a vector adder, in which the harmonic signals furnished by harmonic circuits 28 and 30 are vectorially added, and the amount of the resulting vector sum is furnished as the output signal. Then the factor α can jointly be taken into account. If the phase difference is greater than 60°, the harmonic signals can not be vectorially added and thus, a more complicated system is required to manipulate the data.

While the invention has been described in connection with what is presently considered to be the most practical and preferred embodiment, it is to be understood that the invention is not limited to the disclosed embodiment but, on the contrary, is intended to cover various modifications and equivalent arrangements included within the spirit and scope of the appended claims.

I claim:

1. A method for determining the uniformity of pneumatic tires comprising the steps of:
   mounting a pneumatic tire to be tested on a measuring rim and placing the tire into rolling contact with a tire contact surface of a testing apparatus;
   measuring force fluctuations resulting from the rolling of the tire together with generating and emitting a measuring signal corresponding to the measured force fluctuations;
   detecting eccentricities of the measuring rim by measuring scanners at the measuring rim together with emitting measuring scanner signals;
   generating and emitting an eccentricity signal from the measuring scanner signals
   determining a value corresponding to tire rigidity and multiplying the eccentricity signal by the tire rigidity value to obtain a correction signal;
   subtracting the correction signal, in phase, from the measuring signal to obtain a corrected measuring signal; and
   evaluating the corrected measuring signal to determine tire uniformity.

2. The method of claim 1, whereby the eccentricity signal is generated from one or more harmonics generated from the measuring scanner signals, each harmonic having a measurable amplitude.

3. The method of claim 2, whereby a first harmonic is generated from the measuring scanner signals.

4. The method of claim 2, wherein a value derived from the harmonic amplitudes is multiplied by the value corresponding to the tire rigidity.

5. The method of claim 1, including the additional step of scanning each half of a two piece rim by the measuring scanners and emitting a measuring scanner signal for each rim half.

6. The method of claim 5, including the additional step of forming one eccentricity signal for each rim half, and a resultant eccentricity signal derived from the individual eccentricity signals is multiplied by the value corresponding to the tire rigidity.

7. The method of claim 5, including the additional step of positioning the two rim halves such that in their common revolution, at least one of the harmonics of each measuring scanner signal have the same phase.

8. The method of claim 1, wherein a phase reference is established for detecting the eccentricity signal and the same phase reference is used for detecting the measurement signals.

9. The method of claim 8, including the step of scanning a marking that revolves with the measuring rim to establish the phase reference.

10. An apparatus for determining the uniformity of pneumatic tires comprising:

a measuring rim, on which a pneumatic tire to be tested can be mounted;

a measuring system for measuring force fluctuations that result when the tire is rolled on a contact surface of a testing apparatus and emitting a corresponding measurement signal;

a measuring rim scanner for scanning the measuring rim, the scanner furnishing preliminary error signals corresponding to the eccentricities of the measuring rim;

a signal processing system using the preliminary error signals to calculate a resultant error signal and then multiplying the resultant error signal by a value corresponding to a rigidity of the tire to attain a correction signal;

means for receiving both the measurement signal and the correction signal and for subtracting the correction signal from the measurement signal; and an evaluation system operatively connected to said subtracting means which evaluates the subtracted measurement signal furnished by the subtracting means to determine tire uniformity.

11. The apparatus of claim 10, wherein the signal processing system comprises:

a harmonic circuit for receiving the preliminary error signals and forming at least one harmonic from the preliminary error signals;

a circuit for receiving the harmonics and calculating a resultant error signal from the harmonics;

a multiplication device for receiving the resultant error signal and multiplying this resultant error signal by the value corresponding to the tire rigidity; and a sine wave generator which receives the resultant error signal and uses the multiplied resultant error signal to calculate a correction signal.

12. The apparatus of claim 11, wherein the harmonic circuit forms first harmonics.

13. The apparatus of claim 10, wherein a phase reference is established for detecting the harmonics and the same phase reference for detecting the force fluctuations that result from the nonuniformities of the tire.

14. The apparatus of claim 13, wherein a scanned marking that revolves with the two measuring rim halves is provided to obtain the phase reference.

15. The apparatus of claim 14, wherein a marking is provided for each rim half so that the respective harmonics of each rim half can be determined.

16. The apparatus of claim 15, wherein the markings are used to determine the angular position of each rim half with respect to the other.

17. The apparatus of claim 16, wherein the one rim half is rotated with respect to the other so that the angular position is close to 0 degrees.

18. The apparatus of claim 10, wherein the measurement signal of the measuring system indicates the radial force fluctuations of the tire.

19. The apparatus of claim 10, wherein for dimensioning the amplitude of the sinusoidal correction signal, the sum of the amplitudes of the two first harmonics of the preliminary error signals is acted upon by a factor $\alpha$ that is a function of a ratio of the greater of the two amplitudes to the lesser of the two amplitudes.

* * * * *